US009633426B2

(12) United States Patent
Bendall et al.

(10) Patent No.: US 9,633,426 B2
(45) Date of Patent: Apr. 25, 2017

(54) REMOTE VISUAL INSPECTION IMAGE CAPTURE SYSTEM AND METHOD

(71) Applicant: General Electric Company, Schenectady, NY (US)

(72) Inventors: Clark Alexander Bendall, Syracuse, NY (US); Thomas Charles Ward, Auburn, NY (US); Melissa Rose Stancato, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 362 days.

(21) Appl. No.: 14/292,648

(22) Filed: May 30, 2014

(65) Prior Publication Data
US 2015/0348253 A1    Dec. 3, 2015

(51) Int. Cl.
G06T 7/00    (2006.01)
H04N 7/18    (2006.01)
G06T 5/50    (2006.01)
H04N 5/235   (2006.01)

(52) U.S. Cl.
CPC .............. *G06T 7/0004* (2013.01); *G06T 5/50* (2013.01); *H04N 5/2355* (2013.01); *H04N 7/183* (2013.01); *G06T 2207/10152* (2013.01); *G06T 2207/20208* (2013.01)

(58) Field of Classification Search
None
See application file for complete search history.

(56) References Cited

U.S. PATENT DOCUMENTS 7,239,805 B2    7/2007 Uyttendaele et al.
7,626,614 B1 *  12/2009 Marcu ................. H04N 5/2353
                                                     348/222.1
7,744,528 B2    6/2010 Wallace et al.
(Continued)

FOREIGN PATENT DOCUMENTS

KR    20120133338 A  *  12/2012

OTHER PUBLICATIONS

Teller et al., "Calibrated, registered images of an extended urban area", Proceedings 2001 IEEE Conference on Computer Vision and Pattern Recognition. CVPR 2001. Los Alamitos, CA, IEEE Comp. Soc, US, vol. No. 1, pp. 813-828, Dec. 8, 2001.

(Continued)

*Primary Examiner* — Frederick Bailey
(74) *Attorney, Agent, or Firm* — Fletcher Yoder, P.C.

(57) ABSTRACT

The present disclosure describes an embodiment that provides a tangible, non-transitory, computer-readable medium storing instructions executable by a processor of an endoscope. The instructions include instructions to capture, using an imager in the endoscope, a first plurality of images at a first brightness level while a live video based at least in part on the first plurality of images is displayed, generate, using the processor, a baseline image by averaging or summing the first plurality of images, capture, using the imager, a second plurality of images at a plurality of brightness levels, in which the plurality of brightness levels are different from the first brightness level, and generate, using the processor, a high dynamic range image based at least in part on the baseline image and the second plurality of images, in which the high dynamic range image comprises more unsaturated pixels than the baseline image.

20 Claims, 4 Drawing Sheets

(56) References Cited

U.S. PATENT DOCUMENTS

| | | | |
|---|---|---|---|
| 8,072,507 B2 * | 12/2011 | Fuh | G06T 5/009 |
| | | | 348/229.1 |
| 8,107,083 B2 | 1/2012 | Bendall et al. | |
| 8,213,676 B2 | 7/2012 | Bendall | |
| 9,137,454 B2 * | 9/2015 | Yang | H04N 5/2355 |
| 9,204,113 B1 * | 12/2015 | Kwok | H04N 5/2355 |
| 9,424,632 B2 * | 8/2016 | Patil | G06T 5/50 |
| 2004/0036775 A1 | 2/2004 | Watson, Jr. et al. | |
| 2005/0013501 A1 * | 1/2005 | Kang | G06T 7/2066 |
| | | | 382/254 |
| 2005/0099504 A1 * | 5/2005 | Nayar | H04N 5/235 |
| | | | 348/222.1 |
| 2009/0225333 A1 * | 9/2009 | Bendall | G01N 21/954 |
| | | | 356/626 |
| 2010/0034426 A1 * | 2/2010 | Takiguchi | G01C 21/3602 |
| | | | 382/106 |
| 2012/0002899 A1 * | 1/2012 | Orr, IV | G06T 5/50 |
| | | | 382/282 |
| 2012/0105673 A1 | 5/2012 | Morales | |
| 2013/0293682 A1 * | 11/2013 | Zouda | H04N 13/0207 |
| | | | 348/46 |
| 2013/0308012 A1 * | 11/2013 | Fukutomi | H04N 1/407 |
| | | | 348/229.1 |
| 2014/0232929 A1 * | 8/2014 | Ichikawa | H04N 5/2355 |
| | | | 348/362 |
| 2014/0307117 A1 * | 10/2014 | Feng | H04N 5/2351 |
| | | | 348/218.1 |
| 2015/0051489 A1 * | 2/2015 | Caluser | A61B 8/0825 |
| | | | 600/440 |
| 2015/0161797 A1 * | 6/2015 | Park | G06T 7/0075 |
| | | | 382/154 |
| 2015/0304538 A1 * | 10/2015 | Huang | H04N 5/2355 |
| | | | 348/234 |

OTHER PUBLICATIONS

Clancy et al., "Stroboscopic illumination scheme for seamless 3D endoscopy", Advanced Biomedical and Clinical Diagnostic Systems X, Proc. of SPIE, vol. No. 8214, Issue No. 1, pp. 1-6, Mar. 8, 2012.

International Invitation to Pay Additional Fees issued in connection with corresponding PCT Application No. PCT/US2015/030252 dated Jul. 24, 2015.

* cited by examiner

REMOTE VISUAL INSPECTION IMAGE CAPTURE SYSTEM AND METHOD

BACKGROUND OF THE INVENTION

The present disclosure relates generally to an endoscope system used for the inspection of equipment and facilities, and more particularly to image capturing by the endoscope system.

Certain equipment and facilities, such as power generation equipment and facilities, oil and gas equipment and facilities, aircraft equipment and facilities, manufacturing equipment and facilities, and the like, include a plurality of interrelated systems, and processes. For example, power generation plants may include turbine systems and processes for operating and maintaining the turbine systems. Likewise, oil and gas operations may include carbonaceous fuel retrieval systems and processing equipment interconnected via pipelines. Similarly, aircraft systems may include airplanes and maintenance hangars useful in maintaining airworthiness and providing for maintenance support.

Certain techniques, such as non-destructive inspection techniques or non-destructive testing (NDT) techniques, may be used to inspect and facilitate maintenance of such equipment and facilities. More specifically, such techniques may utilize remote visual inspection devices, such as endoscopes, borescopes, pan-tilt zoom cameras, push cameras, and the like, to inspect the internals without disassembly of a wide variety of equipment and facilities. For example, an endoscope may be utilized to inspect the internal features (e.g., objects or surfaces) in an automobile engine. More specifically, a remote visual inspection system (e.g., endoscope) may be inserted into various openings of the equipment or facility to provide illumination, visual observations, and/or capture images of the internals of the equipment or facility.

Accordingly, it would be beneficial to improve the image capturing capabilities of a remote visual inspection system, for example, by increasing the usability of captured images.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a tangible, non-transitory, computer-readable medium storing instructions executable by a processor of an endoscope. The instructions include instructions to capture, using an imager in the endoscope, a first plurality of images at a first brightness level while a live video based at least in part on the first plurality of images is displayed, generate, using the processor, a baseline image by averaging or summing the first plurality of images, capture, using the imager, a second plurality of images at a plurality of brightness levels, in which the plurality of brightness levels are different from the first brightness level, and generate, using the processor, a high dynamic range image based at least in part on the baseline image and the second plurality of images, in which the high dynamic range image comprises more unsaturated pixels than the baseline image.

A second embodiment provides a processor in a remote visual inspection system that generates a baseline image by averaging or summing together a first plurality of images, in which the first plurality of images is captured using an imager of the remote visual inspection system at a first brightness level, generates a live video feed based at least in part on the first plurality of images, and generates a high dynamic range image using unsaturated pixel data from the baseline image and unsaturated pixel data from at least one of a second plurality of images, in which the second plurality of images is captured using the imager at brightness levels different from the first brightness level.

A third embodiment provides a remote visual inspection system that includes an imager that provides images by converting light into analog image data, an analog to digital converter that converts the analog image data to digital image data, and a processor that captures and processes the digital image data to generate a plurality of images. The remote visual inspection system also includes a display that displays a live video that depicts features proximate to the imager, in which the live video is based at least in part on images captured using the imager at a first brightness level, in which the captured images are used to generate a baseline image, and displays the plurality of images generated by the processor as thumbnails, in which the plurality of images includes the baseline image and a high dynamic range image that is generated by replacing saturated pixels in the baseline image.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
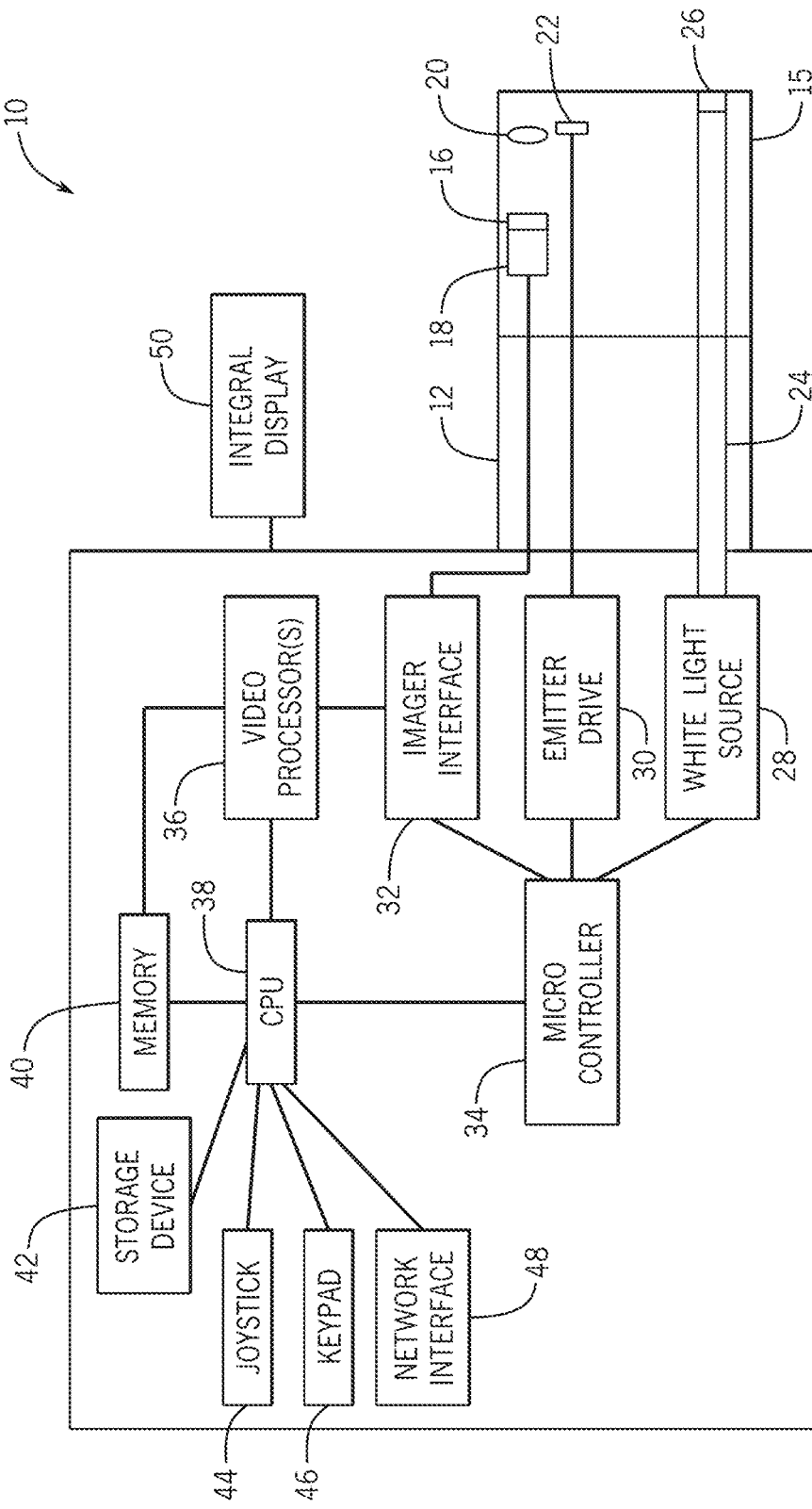
FIG. 1 is a block diagram illustrating an endoscope system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of inspection techniques and systems, including non-destructive testing (NDT) techniques/systems. In some embodiments of an NDT system, a remote visual inspection system (e.g., an endoscope) may be utilized to facilitate testing and/or inspection of equipment and facilities, such as power generation equipment and facilities, oil and gas equipment and facilities, and aircraft equipment and facilities. More specifically, the remote visual inspection system may provide illumination, visualization, and/or other data relating to the internal features (e.g., objects or surfaces) of the equipment or facilities.

To facilitate such functions, a remote visual inspection system generally includes an illumination device (e.g., a light source) and an image capturing device (e.g., an imager). More specifically, the imager may be used to capture images and/or video of features, objects, or surfaces proximate to the imager. For example, when an endoscope probe is inserted into an automobile engine, the imager may be used to capture images of a valve internal to the engine. Since internal features are often obstructed from outside light, a light source, such as a light-emitting diode (LED), may provide illumination for the imager during image and/or video capture. As can be appreciated, in some embodiments, the illumination may be provided by an external source, such as an external illumination device or natural light.

Based on these captured images, a user of the remote visual inspection system may then perform testing and/or inspection of the equipment or facility. For example, the inspection images may be used to provide a visual depiction of the valve in the automobile engine. Additionally, the measurement images may be used to generate a 3D representation (e.g., point cloud data/image or depth profile) of the valve. More specifically, measurement images may take several different forms. For example, stereo measurement images may be captured through the use of stereo optics with a single imager or with a plurality of imagers each having their own optics. Additionally, structured light measurement images may be captured when a light pattern is projected onto a viewed surface or object. More specifically, the projected light pattern may be detected in captured images and used to determine 3D surface data.

Various techniques may be used to project the structured light patterns. For example, in some embodiments, the structured light patterns may be projected using a uniform inspection light source. In other embodiments, a separate light source, such as an emitter module, may be used to project the structured light pattern only during measurement image capture. In further embodiments, when the structured light pattern has sufficient intensity relative to the uniform inspection light, the separate light source may be enabled simultaneously with the uniform inspection light source. Such a structured light pattern may include lines or dots generated using a collimated light source such as a laser with a pattern generating optical element such as a diffractive optic. Still further, when the illumination provided by the uniform inspection light source may reduce the usability of projected structured light pattern, the uniform inspection light source may be disabled when the structured light source is enabled. This would generally be the case when the spectrum of the structured light pattern overlaps or cannot be easily distinguished from that of the uniform inspection light source.

However, in some instances, the usability of the captured images may be hindered because they do not accurately capture the target features. More specifically, portions or all of a captured image may be saturated bright or saturated dark, which may obscure details of a target feature. For example, a weld inside the automobile engine may cause an image to be saturated bright (e.g., "bloomed") due to the high reflectivity of the weld.

Accordingly, one embodiment of the present disclosure describes a remote visual inspection system that captures a first plurality of images at a first brightness level, while a live video based at least in part on the first plurality of images is displayed, and generates a baseline image by averaging or summing the first plurality of images. Additionally, the remote visual inspection system captures a second plurality of images at a plurality of brightness levels, in which the plurality of brightness levels are different from the first brightness level, and generates a high dynamic range image based at least in part on the baseline image and the second plurality of images such that the high dynamic range image comprises more unsaturated pixels than the baseline image.

In other words, as will be described in more detail below, the techniques described herein improve the usability of images captured by the remote visual inspection system by generating high dynamic range images with more unsaturated pixels. As such, the high dynamic range image allows details of the target feature to be more readily recognized. Moreover, the efficiency of generating the high dynamic range image may be improved by generating the high dynamic range image based on a plurality of images captured while a live video is being displayed. For example, in some embodiments, the plurality of images may be continuously captured and individually stored or stored as a summed or averaged image even before any capture image command is received.

To help illustrate, FIG. 1 describes an endoscope system 10 that may utilize the techniques described herein. In some embodiments, the endoscope system 10 may be a XL GO+ VideoProbe, a XLG3 VideoProbe, XL Vu VideoProbe, or the like, available from General Electric Company, of Schenectady, N.Y. It should be appreciated that although the present embodiment describes an endoscope system, the endoscope system is merely intended to be illustrative. In other words, other suitable remote visual inspection systems (e.g., pan-tilt-zoom cameras, push cameras, or borescopes) may also utilize the techniques described herein.

As depicted, the endoscope system 10 includes an insertion tube 12 and a base assembly 14. As used herein, the insertion tube 12 describes the portion of the endoscope system 10 that is inserted into equipment or a facility. As such, the insertion tube 12 is generally long and/or flexible and includes imaging components in the distal tip of the probe (e.g., tip) 15. More specifically, in some embodiments, the probe 15 may be a detachable portion at the distal end of the insertion tube 12. On the other hand, the base assembly 14 generally includes the electronic circuitry for processing data gathered by components of the insertion tube 12, such as the image processing components.

Accordingly, as depicted, the insertion tube 12 includes an imager 16, imager electronics 18, a lens 20, an emitter module 22, a fiber optic bundle 24, and a diffuser 26. In some embodiments, the endoscope system 10 may project a diffused or uniform light pattern onto a target feature (e.g., surface or object) in front of the distal end of the probe 15 via the fiber optic bundle 24 and the diffuser 26. For example, the fiber optic bundle 24 may carry light produced by a white light source 28 through the insertion tube 12 and the diffuser 26 may project a uniform light pattern onto the surface or object. In some embodiments, the white light source 28 may be a light-emitting diode (LED). As in the depicted embodiment, the white light source 28 may be located in the base assembly 14. Alternatively, the white light source 28 may also be included in the insertion tube 12 or the probe tip 15.

In addition to providing a diffused or uniform light pattern, the endoscope system 10 may project a structured light pattern onto a surface or object (e.g., feature) in front of the distal end of the probe tip 15. In some embodiments, the projected structured light pattern may include a pattern of parallel light and dark lines (e.g., areas) with a sinusoidal intensity. Additionally or alternatively, the light pattern may have a square profile, a trapezoidal profile, a triangular profile, curved lines, wavy lines, zigzagging lines, or any other such pattern that may be used to generate 3D point cloud data.

In some embodiments, the structured light pattern may be projected via the emitter module 22. More specifically, the emitter module 22 may include one or more light emitting elements, such as LEDs. For example, the emitter module 22 may include a single light emitting element that outputs light that is passed through an intensity modulating element, such as a line grating, to generate the structured light pattern. Additionally or alternatively the emitter module 22 may include a plurality of light emitting elements that are strategically placed to generate the structured light pattern. Furthermore, the emitter module may produce a plurality of different structured light patterns such that each structured light pattern is phase-shifted relative to the other structured light patterns.

Control over operation of the emitter module 22 may be provided by the emitter drive 30. More specifically, the emitter drive 30 may selectively supply power to the emitter module 22 to produce a structured light pattern. For example, when the emitter module 22 includes a plurality of light emitting elements, the emitter drive 30 may selectively supply power to each of the light emitting elements to produce different structured light patterns. As described above, in some embodiments, when an emitting element in emitter module 22 is powered, the white light source 28 may be disabled to reduce the possibility of the light output from diffuser 26 reducing the contrast of the projected structured light pattern. In some embodiments, the structured light images may be captured and processed to determined 3D surface data.

As described above, the imager 16 along with the imager electronics 18 may be used to capture different images based on the light pattern projected onto the surface or object in front of the distal end of the insertion tube 12. More specifically, the lens 20 may focus light onto the imager 16 and the imager 16 may include a two-dimensional array of light-sensitive pixels that outputs analog image data (e.g., analog signals) to indicate the light level sensed at each pixel. As such, the imager 16 may be a charge-coupled device (CCD) image sensor, a complementary metal-oxide-semiconductor (CMOS) image sensor, or an image sensor with similar function.

In other words, the imager 16 may facilitate the capturing and display of still images and/or videos. For example, the imager 16 may be used to capture inspection images when a uniform or diffused light pattern is projected. On the other hand, the imager 16 may be used to capture measurement images when a structured light pattern is projected. Additionally, in some embodiments, multiple lenses 20 and multiple imagers 16 may be used to capture stereo images. In other embodiments stereo images may be captured using a single imager 16 with a stereo lens system, which may include an image-splitting prism, parallel lens systems, and mirrors.

To facilitate the capture and display of images and/or videos, components in the base assembly 14 may process the analog image data output by the imager electronics 18 and supply control command (e.g., instructions) to components in the insertion tube 12. To facilitate such functions, the base assembly 14, as depicted, includes the white light source 28, the emitter drive 30, an imager interface 32, a microcontroller 34, a video processor 36, a central processing unit (CPU) 38, memory 40, a storage device 42, a joystick 44, a keypad 46, a network interface 48, and a display 50.

In operation, the imager electronics 18 may buffer and transfer the analog image data output by the imager 16 to the imager interface 32. The imager interface 32 may then convert the analog image data into digital image data for further processing by the video processor 36. Accordingly, the imager interface 32 may include an analog-to-digital converter. In some embodiments, the imager interface 32 may additionally include analog gain circuitry and a correlated double sampler.

In addition to processing the analog image data, the imager interface 32 may also transmit control commands to the imager 16. More specifically, the imager interface 32 may relay control commands from the microcontroller 34 to the imager 16. For example, the microcontroller 34 may instruct the imager 16 to capture an image at a specific brightness level via the imager interface 32. More specifically, the instruction may be in the form of an analog shutter control signal when imager 16 is a CCD imager. Additionally or alternatively, the instruction may a serialized message data packet using an I2C, SPI, or other such communication interface when imager 16 is a CMOS imager. In other words, the microcontroller 34 may generally control operation of the imager 16.

Additionally, the microcontroller 34 may also control operation of the imager interface 32, the emitter drive 30, and the white light source 28. For example, the microcontroller 34 may instruct the emitter drive 30 to produce a structured light pattern via the emitter module 22, which is used for capture of a measurement image. Similarly, the microcontroller 34 may instruct the white light source 28 to produce a uniform light pattern, which is used for capture of an inspection image. As described above, the structured light pattern and uniform light pattern may be output simultaneously or at different times. In other words, the microcontroller 34 may generally coordinate and control capture of images.

As described above, the video processor 36 may process the digital image data output by the imager interface 32. In some embodiments, the video processor 36 may be a TMS320DM642 Video/Imaging Fixed-Point Digital Signal Processor, made available by Texas Instruments of Dallas, Tex. More specifically, the video processor 36 may perform functions such as image capturing, color matrix processing, gamma processing, generating video data, and motion detection. For example, the video processor 36 may capture images by storing the digital image data in memory 40 and/or storage device 42.

In addition, the video processor 36 may detect motion by comparing a first image with a second image of the same type (e.g., inspection image or measurement image). Additionally or alternatively, the video processor 36 may identify the location of a sharp brightness transition point in a measurement image and compare it with the location of a sharp brightness transition in an inspection image. In some embodiments, the amount of movement may be based on the number of pixel values that are different between the images and/or the number of pixels the feature has moved between the images. For example, when an identifiable detail of the feature (e.g., a sharp brightness transition) is depicted in a first image at pixel location (50, 50) and in the second image at relatively the same location (e.g., pixel location (51, 50) or (49, 50), it may be determined that there has not been substantial movement between the images. On the other hand, when the identifiable detail of the feature (e.g., the sharp brightness transition) is depicted in the second image at a substantially different location (e.g., pixel location (60, 50)), it may be determined that there has been substantial movement between the images.

Furthermore, the video processor 36 may format the digital image data and output the image data to the display 50. Based on the image data, the display 50 may then display still images captured by the imager 16. Furthermore, the video processor 36 may utilize the digital image data to generate video data and output the video data to the display 50. Based on the video data, the display 50 may display a live video. In some embodiments, the video data may be a BT656 video format and data carried in the video data may have a 422YCRCB data format. Additionally, in some embodiments, the display 50 may be detachable while in other embodiments display 50 may be integral to the base assembly 14 or the endoscope system 10.

In addition to supplying the image data and/or video data to the display 50, the CPU 38 may receive image data from the video processor 36 for further processing. In some embodiments, the CPU 38 may be a Pentium M Processor, made available by Intel Corp. of Santa Clara, Calif. In other words, the CPU 38 may possess greater processing power as compared to the video processor 36. Accordingly, the CPU 38 may perform functions such as frame averaging, scaling, image zooming, overlaying, merging, image flipping, image enhancement (e.g., generation of high dynamic range images), and distortion correction.

It should be appreciated that although the microcontroller 34, the video processor 36, and the CPU 38 are described as separate components, the functions they perform may be implemented by any number of processors, for example, a single general purpose processor. As such, the microcontroller 34, the video processor 36, and the CPU 38 may individually or collectively include one or more "general-purpose" microprocessors, one or more special-purpose microprocessors, one or more application-specific microprocessors (ASICs), one or more field programmable gate arrays (FPGAs), or any combination thereof. Thus, to simplify discussion, they may be collectively referred to as a "processor" in the endoscope system 10. In other words, a processor as used herein may refer to any number of processing components.

To facilitate performing each of the described functions, the processor (e.g., microcontroller 34, the video processor 36, and/or the CPU 38) may retrieve and execute instructions stored in a non-transitory, computer-readable medium, such as the memory 40 or the storage device 42. Generally, the memory 40 and the storage device may store information, such as data to be processed (e.g., image data) and/or executable instructions. Accordingly, the memory 40 may include volatile memory, such as random access memory (RAM), or non-volatile memory, such as read-only memory (ROM). Additionally, the storage device 42 may include flash memory, a network drive, a hard drive, or any other optical, magnetic, and/or solid-state storage media, or any combination thereof.

As described above, the display 50 may display images and/or videos for a user to see. In other words, more generally, the endoscope system 10 may communicate captured information with a user. More specifically, the endoscope system 10 may output information to an operator at the base assembly 14, for example, by displaying information (e.g., images or video) on the display 50. Additionally, the endoscope system 10 may receive input information from the operator at the base assembly 14. More specifically, the operator may provide control commands to the endoscope system 10 via the joystick 44 and/or the keypad 46. For example, the operator may actuate the probe 15 by moving the joystick 44 or may make a menu selection using the keypad 46. Additionally, in some embodiments, the display 50 may be provided in conjunction with a touch-sensitive mechanism (e.g., a touch screen) that provides user inputs. For example, an operator may select or interact with the endoscope system 10 via the touch sensitive mechanism.

In addition, the endoscope system 10 may communicate with remote users, for example, users at a remote computer (e.g., computing device). For example, the endoscope system 10 may form a network with the remote computing device using the network interface 48. In some embodiments, the network interface 48 may provide wireless networking over a wireless 802.11 standard or any other suitable networking standard, such a personal area network (e.g., Bluetooth), a local area network (LAN), or a wide area network (WAN), such as an Enhanced Data Rates for GSM Evolution (EDGE) network or a 3G data network.

In other words, a user may remotely view and/or process captured information as well as remotely issue control commands to the endoscope system 10. For example, in some embodiments, a user may utilize the processing power of the remote computing device to further process images or video captured by the endoscope system 10. Additionally, the user may view the images or video captured by the endoscope system 10 with a display at the remote computing device. In other words, a display that displays video and/or images captured by the endoscope system 10 may be remote and/or detachable.

Figure 2:
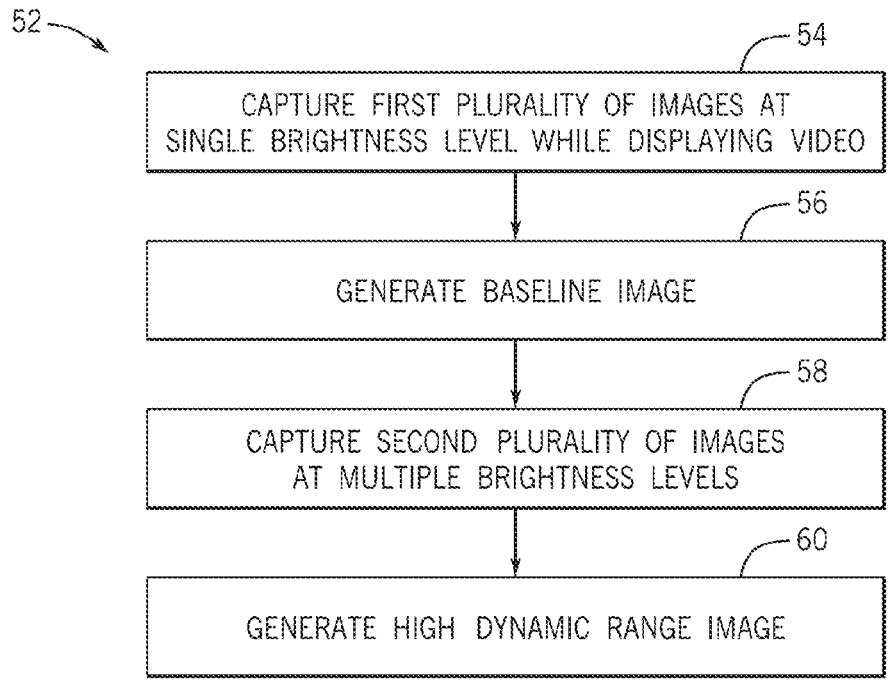
FIG. 2 is a flow diagram of a process for generating images in the endoscope system of FIG. 1, in accordance with an embodiment.

As described above, in some instances, the usability of the images and/or video captured by the endoscope system 10 may be hindered if details of the target feature are obscured by saturated pixels. One embodiment of a process 52 for improving the usability of captured images and/or video is described in FIG. 2. Generally, the process 52 includes capturing a first plurality of images at a single brightness level while displaying a live video (process block 54), generating a baseline image (process block 56), capturing a second plurality of images at multiple brightness levels (process block 58), and generating a high dynamic range image (process block 60). In some embodiments, the process 52 may be implemented via computer-readable instructions stored in the tangible non-transitory memory 40 or storage device 42 and executed by a processor (e.g., microcontroller 34, video processor 36, CPU 38, or processor in remote computing device) in the endoscope system 10.

Accordingly, the processor (e.g., microcontroller 34) may instruct the endoscope system 10 to capture a first plurality of images at a single brightness level (process block 54). Depending on the specific implementation, the first plurality of images may be any suitable type of image, such as measurement images, structured light images, stereo images, or any combination thereof. As such, in some embodiments, the microcontroller 34 may instruct the white light source 28 and/or the emitter drive 30 to produce the desired light pattern at a desired illumination level.

Additionally, the microcontroller 34 may instruct the imager 16 to begin capturing an image, which outputs analog image data representative of light captured by the imager 16. More specifically, the captured image may have a particular brightness level, which may be adjusted by adjusting the illumination level, the exposure time of the imager 16, the gain applied to the analog image data, or any combination thereof. Accordingly, to capture the first plurality of images at the same brightness level, the microcontroller 34 may instruct the imager 16 to use a specific exposure time, the light source (e.g., white light source 28 or emitter module 22) to provide a specific illumination level, and the imager interface 32 to apply a specific gain to the analog image data. As described above, the analog image data may then be converted to digital image data by the imager interface 32 and supplied to the video processor 36.

Upon receiving the digital image data, the processor (e.g., video processor 36) may capture the images and instruct the display 50 to display a live video (process block 54). More specifically, in some embodiments, the video processor 36 may capture the images by storing the digital image data in memory 40 and/or storage device 42. Additionally, the video processor 36 may instruct the display 50 to display a video by outputting video data. More specifically, in some embodiments, the video processor 36 may generate the video data based on the digital image data. For example, when the first plurality of images are still images captured in rapid succession, the video processor 36 may generate the video by instructing the display 50 to display the images in rapid succession. In fact, in some embodiments, the duration between when the image is captured to when it is displayed is relatively short (e.g., within one millisecond on when the image is captured), which enables the video to be displayed in real-time or near real-time as a live video.

In addition to using the first plurality of images to display a video, the processor (e.g., CPU 38 or video processor 36) may use the first plurality of images to generate a baseline image. More specifically, the baseline image may be generated to reduce noise that is present in one of the first plurality of images. Accordingly, various techniques to reduce noise in images may be used, such as averaging or summing the first plurality of images. More specifically, since noise is generally random, averaging or summing the first plurality of images together will accentuate the features that are actually present and reduce the artifacts caused by noise.

In some embodiments, the first plurality of images may be captured when the white light source 28 is enabled. In other words, the first plurality of images may be inspection images. As such, the baseline image generated from a plurality of inspection images may also be an inspection image. In other embodiments, when stereo optics are used, the first plurality of images may be stereo measurement images. As such, the baseline image may also be a stereo measurement image. In further embodiment, the first plurality of images may be captured when a structured light image is projected, for example, when the structured light image has sufficient intensity relative to the uniform inspection light. As such, the baseline image may contain structured light patterns.

To help illustrate, a plurality of images may be summed by adding the pixel value at each pixel location for each image in the plurality of images. As such, the features that are actually present will become brighter in comparison to noise because they will be present in each of the plurality of images while noise is not. Additionally, the plurality of images may be averaged by summing the plurality of images and dividing the pixel values by the number of images summed together. As such, using summing or averaging to generate the baseline image is premised on the fact that the images used generally depict features in the same way. In other words, each of the first plurality of images used to generate the baseline image may be captured with the probe 15 (e.g., imager 16) in substantially the same position relative to the feature. As such, the baseline image may be generated with images captured when there has not been substantial movement by either the probe 15 or the feature.

However, in some embodiments, the endoscope system 10 may continue capturing images and displaying video even when there is movement of the feature relative to the imager 16. In other words, in such embodiments, not all of the images captured and used to display the video are used to generate the baseline image. Nevertheless, in some embodiments, when the movement detected is slight, the endoscope system 10 may attempt to compensate for the movement by translating or rotating the captured images prior to summing or averaging so that blurring is avoided or minimized. For example, if the magnitude of detected movement between a new image and the previous image is less than a threshold (e.g. 8 pixels) or if the confidence level is above a threshold (e.g. >25%), the image may be summed or averaged with the previously captured images to avoid blurring.

In some embodiments, the baseline image may be updated after each new image of the first plurality of images is captured. For example, each time a new image of the first plurality of images is captured, the video processor 36 may retrieve the baseline image from memory 40 or the storage device 42, apply any needed translation or rotation of the new image, and average/sum the new image with the baseline image to update the baseline image, and store the updated baseline image back in memory 40 or the storage device 42. Additionally or alternatively, the baseline image may be updated after a certain number of new images of the first plurality of images are captured. For example, the video processor 36 may update the baseline image after five new images of the first plurality of images are captured.

After the baseline image is generated, the processor (e.g., microcontroller 34) may instruct the endoscope system 10 to capture a second plurality of images with different brightness levels (process block 58). More specifically, in some embodiments, each of the second plurality of images may be captured at a different brightness level. In other embodiments, multiple of the second plurality of images may be captured at the same brightness level. For example, a first image and a second image may be captured at a first brightness level, a third and a fourth image may be captured at a second brightness level, and a fifth and a sixth image may be captured at a third brightness level.

As described above, the processor (e.g., microcontroller 34) may control the brightness level of captured images by adjusting exposure time of the imager 16, gain applied by the imager interface 32, and/or the illumination level provided by the light source (e.g., white light source 28 or emitter module 22). Thus, the processor (e.g., microcontroller 34) may adjust any combination thereof to capture the second plurality of images at different brightness levels. For example, to capture a first image at a first brightness level, the microcontroller 34 may instruct the imager 16 to have an exposure time of one millisecond, and, to capture a second image at a brighter brightness level, the microcontroller may instruct the imager 16 to have an exposure time of two milliseconds.

The exact number of images captured at each brightness level and the brightness levels to use may depend on the specific implementation. More specifically, in some embodiments, the number of images to capture and the brightness levels to use may be defined either by the manufacturer or through user input, for example, via the joystick 44, keypad 46, or the touch-sensitive display. In other embodiments, the number of images to capture and the brightness levels to use may be adaptive. For example, when the processor (e.g., CPU 38 or video processor 36) determines that there are a large number of saturated pixels in the baseline image, the processor may instruct the endoscope system 10 to increase the number of images in the second plurality of images and/or to increase the number of brightness levels used.

In fact, in some embodiments, the number of images captured at each of the different brightness levels may be different. For example, the endoscope system 10 may capture only one image at a brightness level close to the brightness level of the first plurality of images, but may capture three images at a brightness level much darker than the brightness level of the first plurality of images. In some embodiments, the multiple images captured at a same brightness level may be averaged or summed together similar to the first plurality of images to reduce noise.

Depending on the implementation, the switch from capturing the first plurality of images to capturing the second plurality of images may be triggered in various manners. More specifically, in some embodiments, a capture image command may instruct the endoscope system 10 to stop capturing the first plurality of images and begin capturing the second plurality of images. For example, a user may input the capture image command via the joystick 44, the keypad 46, a touch-sensitive display, or even a remote computing device.

In other embodiments, the switch between capturing the first plurality of images and capturing the second plurality of images may be automatic or endoscope initiated. For example, the switch may occur when the processor (e.g., CPU 38 or video processor 36) determines that there is not movement between the imager 16 relative to the target feature. More specifically, when the processor (e.g., CPU 38 or video processor 36) determines that there is not movement, the endoscope system 10 may continue capturing the first plurality of images until a sufficiently noiseless baseline image is generated and then switch to capturing the second plurality of images. Additionally or alternatively, if a sufficiently noiseless baseline image has already been generated (e.g., by translating or rotating images in the first plurality of images), the endoscope system 10 may immediately begin capturing the second plurality of images when movement is not detected.

As described above, the detection of movement may include detecting whether a feature in a first image has moved less than a predetermined number of pixels from the same features in a second image. Additionally, in some embodiments, to minimize blurring, the amount of movement of the feature between the first image (e.g., in the first plurality of images) and the second image (e.g., in the first plurality of images) is determined and used to align the first image before adding/averaging in the first image.

As described above, details of features captured by an image may be obscured by saturated pixels or regions on the image. Accordingly, using the baseline image and the second plurality of images, the processor (e.g., video processor 36 or CPU 38) may generate a high dynamic range image (process block 60). In some embodiments, to generate the high dynamic range image, the processor (e.g., CPU 38 or video processor 36) may utilize unsaturated pixel data from the baseline image and unsaturated pixel data from one or more of the second plurality of images. More specifically, in some embodiments, the replacement unsaturated pixels may be generated by scaling the unsaturated pixel data in the second plurality of images.

For example, when the processor (e.g., CPU 38 or video processor 36) detects saturated pixels in the baseline image, it may generate unsaturated pixels based on the unsaturated pixel data from one or more of the second plurality of images to replace the saturated pixels in the baseline image. In some embodiments, the processor (e.g., CPU 38 or video processor 36) may detect saturated pixels by identifying pixels that have values above an upper threshold (e.g., white level) or below a lower threshold (e.g., black threshold).

Since the pixel data from the second plurality of images is used to generate pixels to replace saturated pixels in the baseline image, in some embodiments, the second plurality of images may be the same type of images as the first plurality of images. For example, if the first plurality of images are inspection images, the second plurality of images may also be inspection images. However, in other embodiments, different image types may alternatively be used. For example, if the first plurality of images are structured light images (e.g. when the structured light pattern has sufficient intensity relative to the uniform inspection light), a second plurality of images that are inspection images (e.g. only uniform inspection illumination) may be used because the feature is uniformly illuminated in the inspection images. In other words, the high dynamic range image may be a measurement image, a stereo image, an inspection image, or any combination thereof.

As such, the high dynamic range image may contain less saturated pixels than the baseline image. In other words, the usability of the high dynamic range image may be better than the baseline image because the high dynamic range image may depict details of the target feature that are obscured in the baseline image (e.g., due to saturation). In fact, to further improve the usability of images captured by the endoscope system 10, multiple high dynamic range images may be generated using the same baseline image and one or more images from the second plurality of images. For example, in some embodiments, a normal high dynamic range image, a bright high dynamic range image, and a dark high dynamic range image may each be generated. In such embodiments, the different high dynamic range images may provide different views of the target feature. More specifically, the brightness differences between these high dynamic range images may be created by applying different linear or non-linear scaling to the captured image data.

Figure 3:
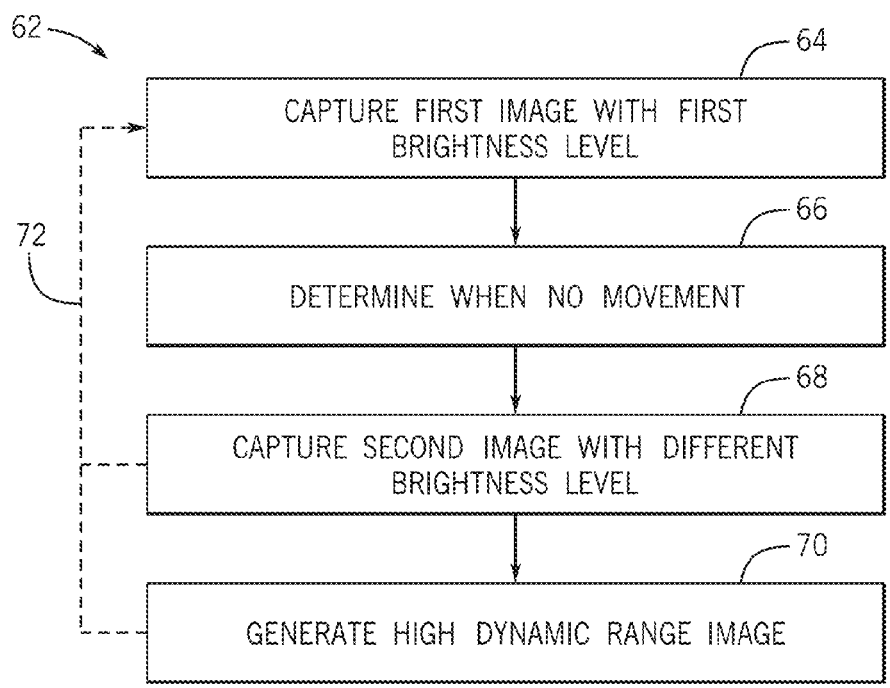
FIG. 3 is a flow diagram of an alternative process for generating images in the endoscope system of FIG. 1, in accordance with an embodiment.

Furthermore, in some embodiments, the capture of the first plurality of images and the second plurality of images may be interspersed. In other words, the endoscope system 10 may capture one or more of the first plurality of images, switch to capturing one or more of the second plurality of images, switch back to capturing one or more of the first plurality of images, and so on. To help illustrate, one embodiment of a process 62 for interspersing the capture of the first plurality of images and the second plurality of images is described in FIG. 3. Generally, the process 62 includes capturing a first image at a first brightness level (process block 64), determining when there is sufficiently little movement (process block 66), capturing a second image at a different brightness level (process block 68), and generating a high dynamic range image (process block 70). In some embodiments, the process 62 may be implemented via computer-readable instructions stored in the tangible non-transitory memory 40 or storage device 42 and executed by a processor (e.g., microcontroller 34, video processor 36, CPU 38, or processor in a remote computing device) in the endoscope system 10.

Accordingly, in some embodiments, the processor (e.g., microcontroller 34) may instruct the endoscope system 10 to capture a first image at a first brightness level (process block 64). In some embodiments, the first image may be one of the first plurality of images described above. Accordingly, the first image may be captured using techniques described in process block 54. More specifically, as discussed above, the processor (e.g., microcontroller 34) may instruct the imager 16 to capture the first image using a specific exposure time, the imager interface 32 to apply a specific gain, and the light source (e.g., white light source 28 or emitter module 22) to provide a specific illumination level/pattern. The first image may then be captured by storing the digital image data in memory 40 or the storage device 42. Additionally, the first image or a video generated using the first image may be displayed on the display 50 or a display at a remote computing device. Furthermore, the first image may be utilized to generate the baseline image.

When the processor (e.g., CPU 38 or video processor 36) determines that there is sufficiently little movement between the imager 16 relative to the feature depicted in the first image (process block 66), the processor (e.g., microcontroller 34) may instruct the endoscope system 10 to capture a second image at a brightness level different from the first brightness level (process block 68). As described above, the processor (e.g., CPU 38 or video processor 36) may detect whether there is movement using any suitable technique, such as comparing the first image with another image in the first plurality of images and determining the number of pixel values that are different between the images and/or the number of pixels the feature has moved between the images.

Additionally, in some embodiments, the second image may be one of the second plurality of images described above. Accordingly, the second image may be captured using techniques described in process block 58. More specifically, as discussed above, the processor (e.g., microcontroller 34) may instruct the imager 16 to capture the second image using a specific exposure time, the imager interface 32 to apply a specific gain, and the light source (e.g., white light source 28 or emitter module 22) to provide a specific illumination level/pattern. The second image may then be captured by storing the digital image data in memory 40 or the storage device 42.

After the second image is captured, the endoscope system 10 may optionally return to capturing the first plurality of images (arrow 74). More specifically, in some embodiments, the endoscope system 10 may switch back to capturing the first plurality of images without generating a high dynamic range image. In other embodiments, the processor (e.g., CPU 38 or video processor 36) may generate a high dynamic rage image using the second image (process block 70).

In other words, in some embodiments, the endoscope system 10 may capture additional images with different brightness levels. The exact number of images with different brightness levels may vary depending on implementation. For example, in some embodiments, only the second image is captured. In other embodiments, the second image along with other images from the second plurality of images may be captured.

Based on the above example, the determination that there is sufficiently little movement may be a trigger to capture the second image, and, more generally, a trigger to switch from capturing the first plurality of images to the second plurality of images. Using the lack of movement as a trigger may be advantageous in various implementations. For example, as discussed above, the endoscope system 10 may stop capturing the first plurality of images and begin capturing the second plurality of images when movement is not detected.

In fact, using the lack of movement as a trigger to capture one or more of the second plurality of images may be particularly useful when the capture of the first plurality of images and the capture of the second plurality of images is interspersed. For example, in some embodiments, when the processor (e.g., CPU 38 or video processor 36) detects saturated pixels in the baseline image or the first image, it may display a prompt instructing the local user to stay in the same position so that the second plurality of images may be captured. In such an embodiment, since the second plurality of images that may be used to replace the saturated pixels are captured as soon as the saturation is detected, the image displayed to a user may be a high dynamic range image.

In fact, in some embodiments, the high dynamic range image may be used to display a high dynamic range video to the user. Although additional processing is used to generate the high dynamic range image, the technical advances in processing power present the possibility of generating the high dynamic range image in near real time. Additionally, it should be appreciated that the endoscope system 10 will generally move slowly within the equipment or facility, which relaxes the time constraints on displaying video. In other words, near real time video (e.g., high dynamic range video) may be sufficient to provide a user with an indication of features proximate to the imager 16.

In addition to generating high dynamic range images, the images captured by the endoscope system 10 may be used to determine other information relating to the target feature. For example, in some embodiments, the captured images may be used to generate point cloud data, a point cloud image, and/or a depth profile of the feature to describe the 3D profile of the target feature. As such, in some embodiments, multiple pieces of information relating to the feature may be presented simultaneously or substantially simultaneously.

Figure 4:
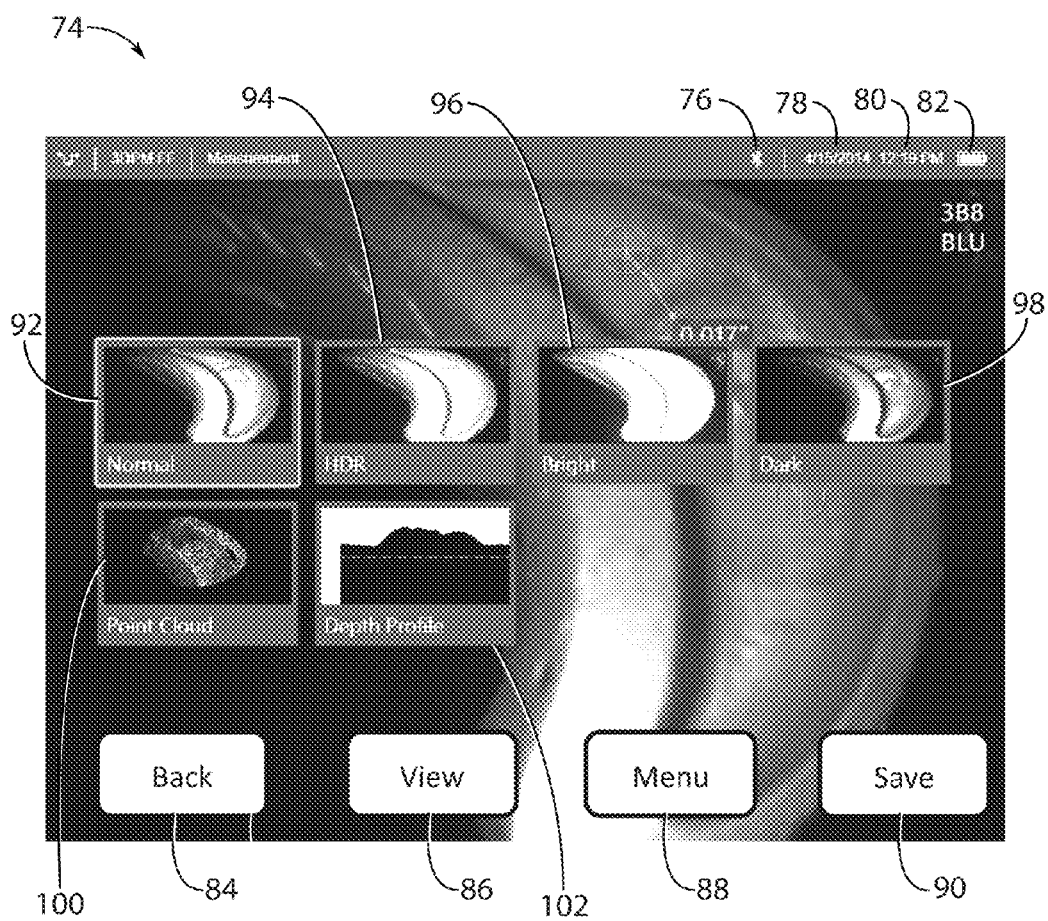
FIG. 4 is screen view of a plurality of captured images displayed by the endoscope system of FIG. 1, in accordance with an embodiment.

For example, in the embodiment depicted in the screen view 74 described in FIG. 4, various images captured and generated by the endoscope system 10 may be substantially simultaneously viewed. More specifically, the screen view 74 may be displayed on any suitable display, such as the display 50 or a display at a remote computing device.

As such, in addition to merely displaying the various captured and generated images, the screen view 74 may display status information of the endoscope system 10. For example, in the depicted embodiment, the screen view 74 displays a network status icon 76, a date indicator 78, a time indicator 80, and a battery status icon 82. More specifically, in the depicted embodiment, the network status icon 76 indicates that the endoscope system 10 is connected in a Bluetooth network, the date indicator 78 indicates that the current date is Apr. 15, 2014, the time indicator 80 indicates that the current time is 12:19 PM, and the battery status icon 82 indicates that the battery is fully charged.

Additionally, as described above, a user may interact with the endoscope system 10, for example, by inputting user commands via the joy stick 44 or the keypad 46. For example, as will be described in more detail below, a user may select one of the various views on the screen view 74 to display in full screen. Additionally, as described above, the display 50 may be a touch-sensitive display, which provides the ability to use soft buttons. For example, as in the depicted embodiment, the screen view 74 includes a back soft button 84, a view soft button 86, a menu soft button 88, and a save soft button 90. More specifically, the user may select the back soft button 84 to go back to a previous screen, the view soft button 86 to view a selected thumbnail image, the menu button 88 to go to a menu, or the save soft button 90 to save a selected image. As can be appreciated, the soft buttons presented on the display 50 are programmable and may change based on what is being displayed.

As described above, the screen view 74 may display various images captured and/or generated by the endoscope system 10. For example, in the depicted embodiment, the screen view 74 displays a normal image 92, a high dynamic range image 94, a bright image 96, a dark image 98, a point cloud image 100, and a depth profile image 102. As depicted, the various images may be depicted as thumbnails to substantially simultaneously display the images. Thus, a user may interact with the various images, for example, via the keyboard 46, the joystick 44, and/or the touch-sensitive display. For instance, a user may select one of the thumbnail images to save or view in full screen.

Figure 5:
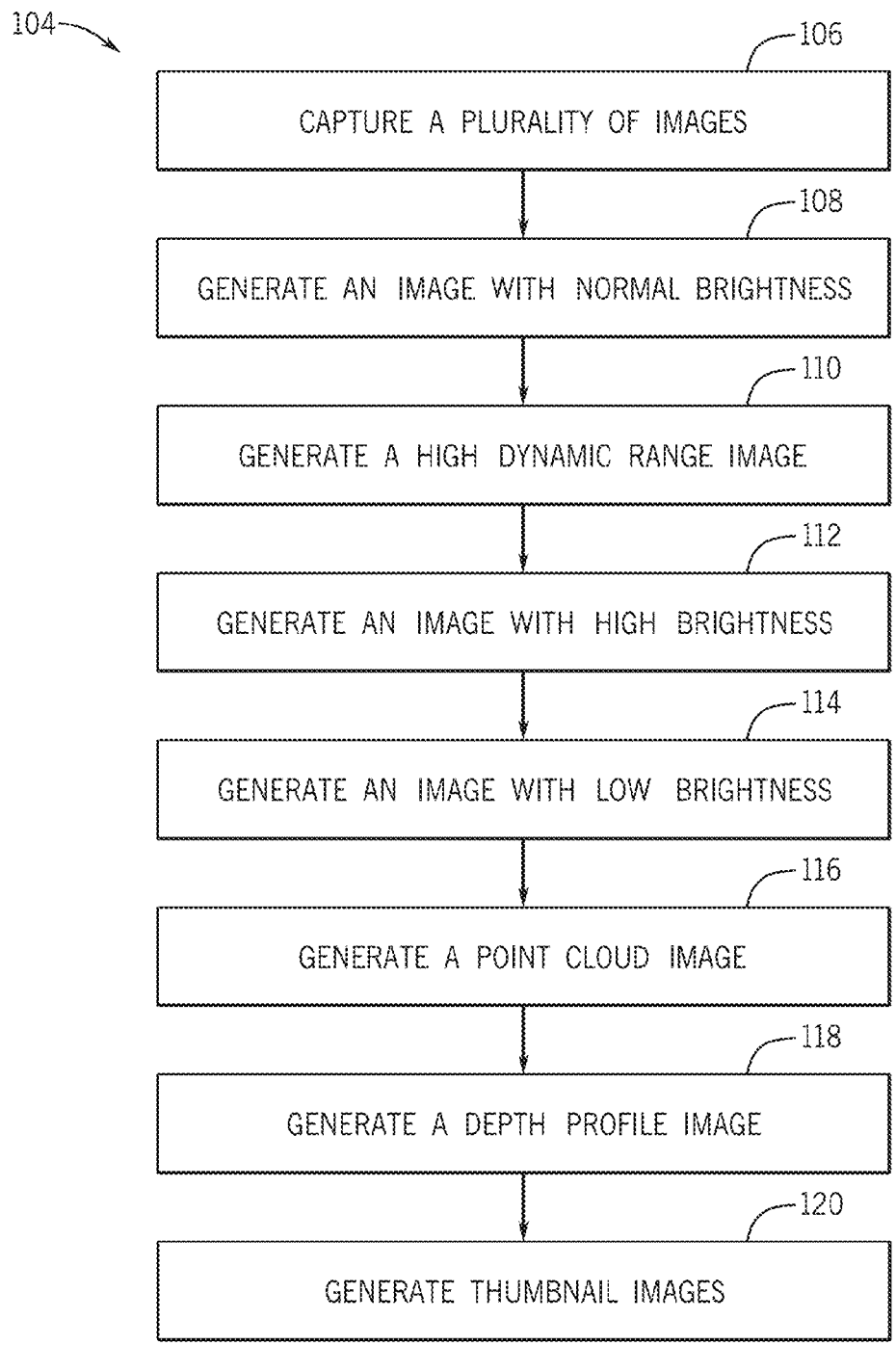
FIG. 5 is a flow diagram of a process for displaying the screen view of FIG. 4, in accordance with an embodiment.

One embodiment of a process 104 that may be utilized to generate the screen view 74 is described in FIG. 5. Generally, the process 104 includes capturing a plurality of images (process block 106), generating an image with normal brightness (process block 108), generating a high dynamic range image (process block 110), generating an image with high brightness (process block 112), generating an image with low brightness (process block 114), generating a point cloud image (process block 116), generating a depth profile image (process block 118), and generating thumbnail images (process bock 120). In some embodiments, the process 104 may be implemented via computer-readable instructions stored in the tangible non-transitory memory 40 or storage device 42 and executed by a processor (e.g., microcontroller 34, video processor 36, CPU 38, or processor in a remote computing device) in the endoscope system 10.

Accordingly, in some embodiments, the processor (e.g., microcontroller 34) may instruct the endoscope system 10 to capture a plurality of images. More specifically, the plurality of images may include the first plurality of images and/or the second plurality of images described above, which as described above may be captured in response to a user initiated capture request, a detection of sufficiently little movement, or a detection of saturated pixels in the first plurality of images. As such, the processor (e.g., microcontroller 34) may instruct the imager 16 to capture images at a desired brightness level. As described above, the processor (e.g., microcontroller 34) may control the brightness level of captured images by adjusting exposure time of the imager 16, gain applied by the imager interface 32, and/or the illumination level provided by the light source (e.g., white light source 28 or emitter module 22). Additionally, as described above, the endoscope system 10 may capture the plurality of images by storing the digital image data in memory 40 or the storage device 42.

Once one or more of the plurality of images is captured, the processor (e.g., CPU 38 or video processor 36) may instruct the endoscope system 10 to generate an image with normal brightness (process block 108). In some embodiments, the normal brightness image may merely be one of the captured images. In other embodiments, the normal brightness image may be a baseline image generated based on the first plurality of images. In such embodiments, the processor (e.g., CPU 38 or video processor 36) may instruct the endoscope system 10 to generate the normal brightness image by summing or averaging together images from the first plurality of images.

Additionally, the processor (e.g., CPU 38 or video processor 36) may instruct the endoscope system 10 to generate a high dynamic range image (process block 110). As discussed above, in some embodiments, the high dynamic range image may be generated based at least in part on one or more of the first plurality of images (e.g., baseline image) and one or more of the second plurality of images. More specifically, in such embodiments, saturated pixels in the normal image may be replaced with unsaturated pixels generated based on unsaturated pixel data in one or more of the second plurality of images.

In addition to the high dynamic range image, the processor (e.g., CPU 38 or video processor 36) may instruct the endoscope system 10 to generate an image with a high brightness level (process block 112) and to generate in image with a low brightness level (process block 114). As described above, images with different brightness levels may allow a user to have varying views of the feature. In some embodiments, the high brightness image may be a single image captured with a higher brightness level than the normal image. Similarly, in some embodiments, the low brightness image may be a single image captured with a lower brightness level than the normal image. In such embodiments, the high brightness image and/or the low brightness image may simply be one of the second plurality of images.

In other embodiments, the high brightness image and/or the low brightness image may also be high dynamic range images. In such embodiments, the high brightness image may be a high dynamic range image with brightness scaled higher than the high dynamic range image generated in process block 110 and/or have a pixel value mean higher than the baseline image. Similarly, the low brightness image may be a high dynamic range image with brightness scaled lower than the high dynamic range image generated in process block 110 and/or have a pixel value mean lower than the baseline image. In other words, the techniques described herein provides for the ability to generate multiple high dynamic range images, which vary in brightness level. As described above, a high dynamic range image generally contains less noise and less saturated pixels than a single image. In other words, the usability of images generated by the endoscope system 10 may be further improved by not only displaying images with varying brightness levels, but also displaying images at the varying brightness levels with less saturated pixels.

As described above, images captured by the endoscope system 10 may be any number of suitable image types, such as measurement images, stereo images, inspection images, or any combination thereof. More specifically, the varying image types may enable different information relating to the target feature to be determined. For example, inspection images (e.g., images captured with uniform brightness) may depict the target feature from the perspective of the imager 16. On the other hand, stereo images and/or structured light measurement images may be used to generate point could data, which may then be used to generate a point cloud image and/or a depth profile.

As such, the processor (e.g., CPU 38 or video processor 36) may instruct the endoscope system 10 to generate a point cloud image (process block 116) and to generate a depth profile image (process block 118). More specifically, the point cloud image may be based on point cloud data generated to give a 3D representation of the target feature. In some embodiments, the point cloud image may be based on a subset of the point cloud data, which is selected based on positioning of measurement cursors or a selected region of interest. Additionally, the depth profile may be based on point cloud data generated to give a cross sectional view of the target feature. In some embodiments, the location of the depth profile may be selected by the user by positioning of measurement cursors.

In some embodiments, the point cloud data may be generated using measurement images (e.g., structured light images) or stereo images. For example, the point cloud data may be generated by using phase shift analysis on structured light images, which are captured while a structured light pattern is projected onto the viewed surface. Additionally or alternatively, the point cloud data may be generated using stereo images captured from different perspectives. As such, the more details of the feature captured in the measurement images, the more accurate the generated point cloud image.

However, as described above, details of the target feature may be obscured in captured images when pixels are saturated. For example, when a weld (e.g., highly reflective surface) on an object or surface proximate to the imager 16 causes the weld to appear saturated in the captured images, it will be difficult to accurately determine the 3D characteristics (e.g., height or shape) of the weld because the weld will appear completely white.

In some embodiments, the second plurality of images may be used to improve the capture of details of the target feature. More specifically, as described above, the second plurality of images may include measurement images captured at different brightness levels. As such, the point cloud data may be generated using images with varying brightness level to increase the number of 3D surface data points that are determined.

To help illustrate, point cloud data may be generated by matching a surface point captured in images taken from different perspectives. However, when stereo measurement images include pixels that are saturated (e.g., too bright or too dark), stereo matching may be hindered because it may be difficult to distinguish the same surface point in the images. For example, continuing with the above example, it may be difficult to locate the same point on the weld in multiple stereo images because the weld appears completely white. However, the same pixels in one or more of the second plurality of images may be unsaturated. As such, the processor may utilize the one or more of the second plurality of image to perform stereo matching and generate the point cloud data. In other words, any combination of one or more of the first plurality of images, the baseline image, one or more of the second plurality of images, and a generated high dynamic range image, may be used to generate the point cloud data.

Similarly, if a structured light pattern, such as a laser dot grid, is captured in both the first and second pluralities of images, the processor may detect the position of the pattern using any combination of one or more of the first plurality of images, the baseline image, one or more of the second plurality of images, and a generated high dynamic range image. The processor may then use the detected pattern position to determine 3D surface data.

Additionally, as described above, the second plurality of images may be used to generate a high dynamic range image, which may reduce the amount of saturation and may be any suitable image type. Accordingly, the data or images generated using the high dynamic range image may be more usable. For example, continuing with the above example, one or more high dynamic measurement images may be used to compensate for the high reflectivity of the weld and depict more details of the characteristics of the weld. Thus, using high dynamic range measurement images to generate point cloud data/images may provide more accurate information relating to the feature, which also improves the accuracy of the point cloud image and the depth profile image.

The processor (e.g., CPU 38 or video processor 36) may then instruct the endoscope system 10 to display the generated images (e.g., normal brightness image, high brightness image, high dynamic range image, low brightness image, point cloud image, or depth profile image) as thumbnail images (process block 120). In some embodiments, generating the thumbnail images may include scaling the generated images to the thumbnail size. As described above, the thumbnail images may be selectable by a user, for example, to save or display the image corresponding with the thumbnail image in full screen. Accordingly, since in some embodiments the display 50 may be a touch-sensitive display, generating the thumbnail images may include generating thumbnail image soft buttons selectable by a user.

Based on the above description, the technical effect of the present disclosure includes providing systems and methods for improving usability of images captured by a remote visual inspection system, such as an endoscope system. More specifically, the usability of images may be improved by generating one or more high dynamic range images. Furthermore, the high dynamic range images may be captured and generated more efficiently. For example, the high dynamic range images may be generated based on images that are used to display a live video. In other words, the remote visual inspection system may begin generating a high dynamic range image even before a capture command is received.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A tangible, non-transitory, computer-readable medium storing instructions executable by a processor of an endoscope, wherein the instructions comprises instructions to:
   instruct, using the processor, an imager in the endoscope to capture a first plurality of images at a first brightness level while a live video based at least in part on the first plurality of images is displayed;
   generate, using the processor, a baseline image by averaging or summing the first plurality of images to reduce a likelihood of a visual artifact caused by noise in one or more of the first plurality of images being present in the baseline image;
   instruct, using the processor, the imager to capture a second plurality of images at a plurality of brightness levels, wherein the plurality of brightness levels are different from the first brightness level; and
   generate, using the processor, a first high dynamic range image by modifying the baseline image based at least in part on the second plurality of images, wherein the first high dynamic range image comprises more unsaturated pixels than the baseline image.

2. The computer readable medium of claim 1, wherein the instructions to generate the first high dynamic range image comprises instruction to:
  detect a saturated pixel in the baseline image;
  generate first unsaturated pixel data by scaling second unsaturated pixel data from at least one of the second plurality of images; and
  replace the saturated pixel with the first unsaturated pixel data.

3. The computer readable medium of claim 1, wherein the instructions comprise instructions to determine whether a feature proximate to the imager has substantially moved relative to the imager by comparing two or more of the first plurality of images.

4. The computer readable medium of claim 3, wherein the second plurality of images is automatically captured when substantial movement is not detected.

5. The computer readable medium of claim 1, wherein the first high dynamic range image comprises fewer visual artifacts caused by noise compared to a second high dynamic range image generated by modifying one of the first plurality of images based at least in part on the second plurality of images.

6. The computer readable medium of claim 1, wherein the instructions to instruct the imager to capture the second plurality of images comprises instructions to change brightness between capture of one or more of the second plurality of images by changing exposure time of the imager, applied gain, an illumination level of a light source on the endoscope, or any combination thereof.

7. The computer readable medium of claim 1, wherein the instructions comprise instructions to capture a structured light image or a stereo image while capturing the second plurality of images.

8. The computer readable medium of claim 1, wherein:
  the instructions to instruct the image to capture the second plurality of images comprises instructions to:
    instruct the imager to capture a first image of the second plurality of images at a second brightness level;
    instruct the imager to capture a second image of the second plurality of images at a third brightness level different from the second brightness level; and
    instruct, the imager to capture a third image of the second plurality of images at the second brightness level; and
  the instructions to generate the first high dynamic range image comprises instructions to:
    generate a composite image by averaging or summing the first image and the third image; and
    generate the first high dynamic range image based at least in part on the composite image, the second image, and the baseline image.

9. The computer readable medium of claim 1, wherein instructions comprise instructions to:
  generate, using the processor, a second high dynamic range image based at least in part on the baseline image and the second plurality of images, wherein the second high dynamic range image is darker than the first high dynamic range image; and
  generate, using the processor, a third high dynamic range image based at least in part on the baseline image and the second plurality of images, wherein the third high dynamic range image is brighter than the first high dynamic range image.

10. A processor in a remote visual inspection system configured to:
  generate a baseline image by averaging or summing together a first plurality of images to accentuate a proximate feature in the first plurality of images relative to visual artifacts caused by noise, wherein the first plurality of images are captured using an imager of the remote visual inspection system at a first brightness level;
  generate a live video feed based at least in part on the first plurality of images; and
  generate a first high dynamic range image by modifying the baseline image using first unsaturated pixel data from the baseline image and second unsaturated pixel data from at least one of a second plurality of images, wherein the second plurality of images are captured using the imager at brightness levels different from the first brightness level.

11. The processor of claim 10, wherein the processor is configured to:
  detect motion of the proximate feature relative to the imager by comparing images from the first plurality of images; and
  automatically capture the second plurality of images when motion is not detected.

12. The processor of claim 10, wherein the first high dynamic range image comprises less visual artifacts caused by noise compared to a second high dynamic range image generated by modifying one of the first plurality of images based at least in part on the second plurality of images.

13. The processor claim 10, wherein the processor is configured to, subsequent to an image capture command being received:
  stop capturing the first plurality of images; and
  begin capturing the second plurality of images.

14. A remote visual inspection system, comprising:
  an imager configured to provide images by converting light into analog image data;
  an analog to digital converter communicatively coupled to the imager, wherein the analog to digital converter is configured to convert the analog image data to digital image data;
  a processor communicatively coupled to the analog to digital converter, wherein the processor is configured to capture and process the digital image data to generate a first plurality of images; and
  a display communicatively coupled to the processor, wherein the display is configured to:
    display a live video that depicts features proximate to the imager based at least in part on a second plurality of images captured at a first brightness level, wherein the first plurality of images is used to generate a baseline image that accentuates the features proximate the imager relative to noise artifacts present in one or more of the second plurality of images; and
    display the first plurality of images generated by the processor as thumbnails, wherein the plurality of images comprises the baseline image and a first high dynamic range image that is generated by replacing saturated pixels in the baseline image based at least in part on a third plurality of images captured at a plurality of brightness levels different from the first brightness level.

15. The remote visual inspection system of claim 14, comprising a network interface configured to:
  transmit the live video or the first plurality of images to a remote computing device; and receive control commands from the remote computing device, wherein the remote computing device comprises the display.

16. The remote visual inspection system of claim 14, wherein the processor is configured to generate a point cloud image based at least in part on the second plurality of images.

17. The remote visual inspection system of claim 14, wherein the first plurality of images comprises a point cloud image, a first image with a brightness level higher than the baseline image, a second image with a brightness level lower than the baseline image, a cross sectional image, or any combination thereof.

18. The remote visual inspection system of claim 14, wherein the remote visual inspection system comprises an endoscope, a pan-tilt-zoom inspection camera, a push camera, a borescope, or any combination thereof.

19. The remote visual inspection system of claim 14, wherein the first high dynamic range image comprises fewer noise artifacts compared to a second high dynamic range image generated by modifying one of the second plurality of images based at least in part on the third plurality of images.

20. The remote visual inspection system of claim 14, wherein the processor is configured to generate the first high dynamic range image by:
    detecting a saturated pixel in the baseline image;
    generating first unsaturated pixel data by scaling second unsaturated pixel data from at least one of the third plurality of images; and
    replacing the saturated pixel with the first unsaturated pixel data;

generate a second high dynamic range image based at least in part on the baseline image and the third plurality of images, wherein the second high dynamic range image is darker than the first high dynamic range image; and generate, using the processor, a third high dynamic range image based at least in part on the baseline image and the third plurality of images, wherein the third high dynamic range image is brighter than the first high dynamic range image.

\* \* \* \* \*